United States Patent [19]

Pfeifer et al.

[11] 4,069,989

[45] Jan. 24, 1978

[54] CARTRIDGE FOR STRIP-SHAPED RECORD CARRIERS

[75] Inventors: Josef Pfeifer, Unterhaching; Wilfried Hofmann, Taufkirchen; Traugotte Liermann, Unterhaching, all of Germany

[73] Assignee: AGFA-Gevaert AG, Leverkusen, Germany

[21] Appl. No.: 694,612

[22] Filed: June 10, 1976

[30] Foreign Application Priority Data

June 13, 1975 Germany .............................. 2526483

[51] Int. Cl.² .......................... G03B 1/04; G11B 15/32
[52] U.S. Cl. ....................................... 242/195; 352/72
[58] Field of Search ............... 242/195, 197, 198, 192; 352/72-78 R, 78 C; 360/93-95, 96, 132

[56] References Cited

U.S. PATENT DOCUMENTS

| 3,653,608 | 4/1972 | Dickens et al. | 242/199 |
| 3,974,982 | 8/1976 | Stone | 242/192 |

*Primary Examiner*—Leonard D. Christian
*Attorney, Agent, or Firm*—Michael J. Striker

[57] ABSTRACT

A cartridge is disclosed in which a hub is rotatable in a housing and has its periphery partly embraced by an endless band that is mounted for travel in the housing. The band is trained about a plurality of guide rollers at least one of which is located outwardly adjacent the hub and is mounted so that it can move towards and away from the hub. Movement away from the hub is opposed by a permanently acting biasing force.

14 Claims, 3 Drawing Figures

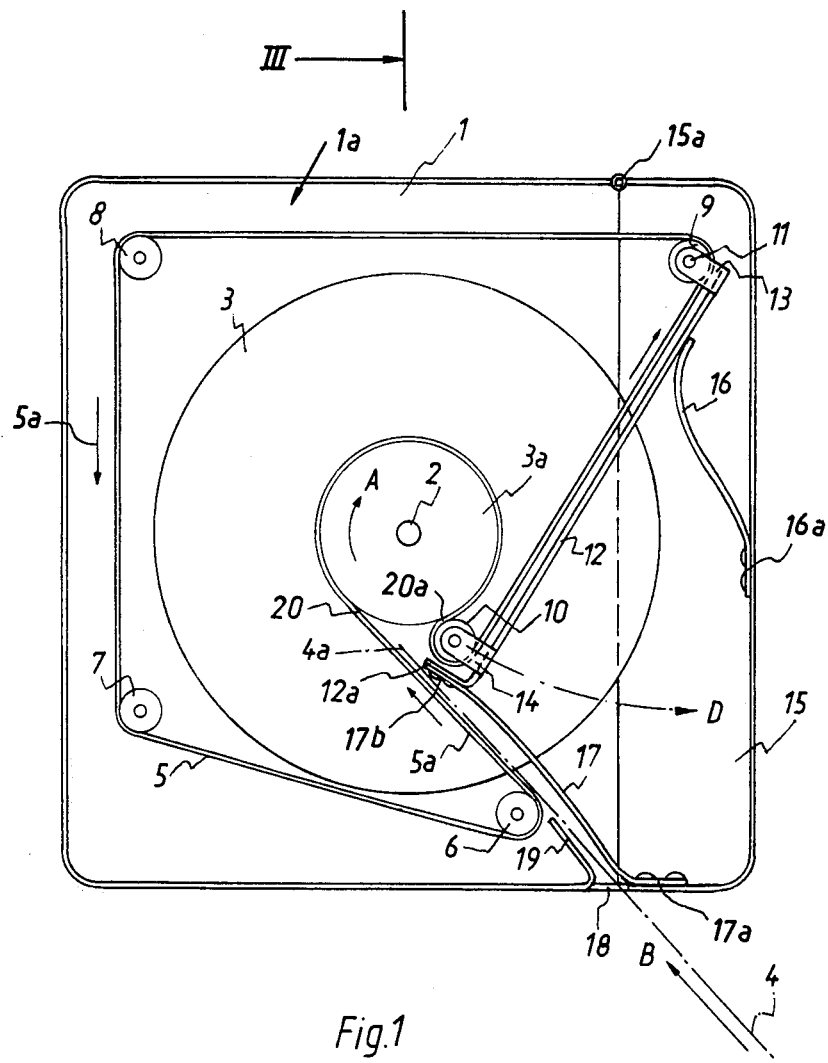

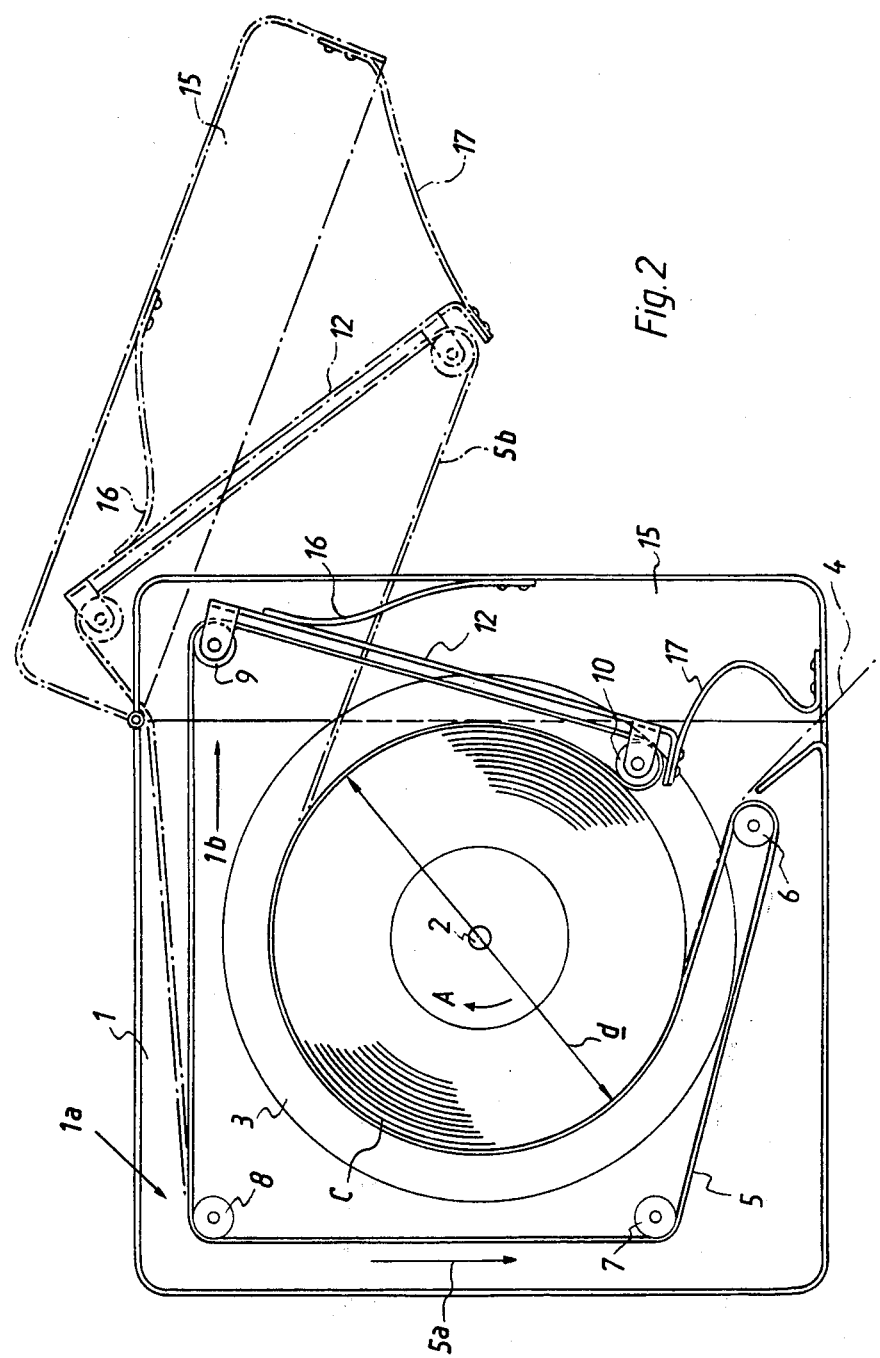

CARTRIDGE FOR STRIP-SHAPED RECORD CARRIERS

BACKGROUND OF THE INVENTION

This invention relates to a cartridge of the type having a rotatable hub for taking up and paying out a strip-shaped record carrier. More particularly the invention relates to a microfilm cartridge.

Various proposals have been made in the prior art for such cartridges. For reasons known to those skilled in the art, none of these proposals have been completely satisfactory. In some instances, the arrangement for engaging a free end of a record-carrier to be taken up onto the hub is complicated and/or its operation is unreliable. Also, the prior-art devices generally do not take up record-carriers which are not perforated along at least one longitudinal margin. For these and other reasons, further improvements in the type of cartridge under discussion are highly desirable.

SUMMARY OF THE INVENTION

It is an object of the present invention to provide such improvements.

A more specific object of the invention is to provide a cartridge for microfilms and analogous strip-shaped record carriers, which avoids the prior-art disadvantages.

Another object is to provide such a cartridge which has a simple and operationally reliable arrangement for automatically drawing in and winding up strip-shaped record carriers.

A concomitant object of the invention is to provide such a cartridge wherein the aforementioned arrangement acts reliably upon the record carrier, whether or not the same is provided with marginal perforations.

Pursuant to the above objects, and to still others which will become apparent hereafter, the invention pertains to a cartridge of the type in which strip-shaped record carriers, particularly microfilm strips, are spooled onto and off a rotatable hub.

According to one aspect of the invention the improved cartridge may, briefly stated, comprise a housing forming a chamber in which a hub is rotatably mounted, an endless travelling band in the chamber, and means mounting the band for its travel.

The band is arranged for travel in a path in which it embraces the periphery of the hub from a first location at which it runs onto the hub, to a second location at which it runs off the hub and which is spaced circumferentially from the first location. The band is advanced in its path in response to rotation of the hub.

The mounting means includes a plurality of band-guiding element about which the band is trained. At least one of these elements is mounted outwardly adjacent the hub in such a manner that it can move towards and away from the hub periphery; it is permanently biased towards the periphery.

When the cartridge is empty and a strip-shaped record carrier is to be taken up on the hub, the latter is rotated in known manner. It is conventional for such hubs to be mounted on a rotatable shaft which extends to the exterior of the cartridge where it is engaged by a suitable motion-imparting instrumentality which does not form any part of the present invention. When the cartridge is still empty, the portion of the endless band which embraces the hub is in frictional contact herewith; hence, rotation of the hub causes the band to become entrained and travel in its endless path.

That section of the endless band which tangentially approaches the point where the band runs onto the hub periphery, bounds with the free (i.e. not embraced) portion of the periphery a wedge-shaped space which tapers towards the run-on point. The housing has an inlet opening through which a leading end portion of a record carrier can be pushed until it enters the wedge-shaped space and is engaged and gripped at the run-on point between the band and the hub surface. The thus engaged leading end portion now travels between the band and the hub surface past the run-off point of the band and re-enters the wedge-shaped space to return to the run-on point. At this time, the leading end portion has formed a complete convolution about the hub to which it is now reliably secured. Continued rotation of the hub now results in continued taking-up of the record carrier on the hub.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a section through a cartridge embodying the invention, showing a leading end of a record carrier in process of being inserted;

FIG. 2 is a view similar to FIG. 1, but showing a length of the record carrier taken up on the hub.

DETAILED DESCRIPTION OF A PREFERRED EMBODIMENT

Figure 3:
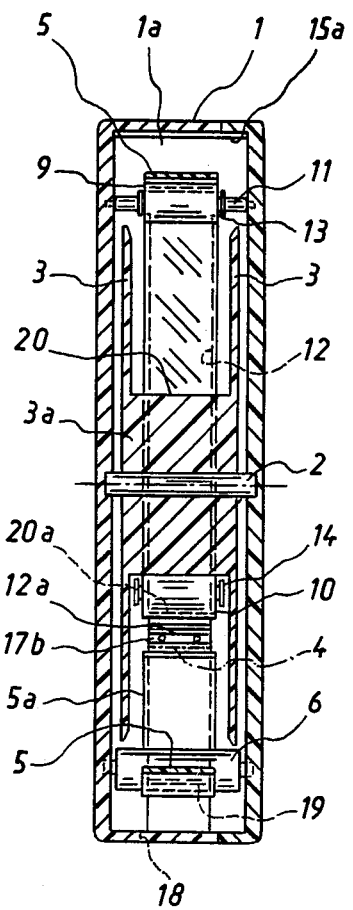
FIG. 3 is a section on line III—III of FIG. 1.

FIGS. 1-3 show a single, exemplary embodiment of the improved cartridge according to our invention.

The cartridge has a housing composed of a main housing portion 1 which forms an interior chamber 1a and has an open side 1b, and a cover portion 15 which is pivoted to the main portion 1 at 15a and can be moved between a closure position shown in solid lines and an open position which is shown in FIG. 2 in phantom lines.

The usual rotatable shaft 2 is mounted in a side wall of the main housing portion 1. A spool 3 for a strip-shaped record carrier 4, e.g. microfilm, is mounted with its hub 3a on the shaft 2, for rotation in the direction indicated by arrow A.

Also located in chamber 1a is an endless band 5 of natural or synthetic rubber or of synthetic plastic material. Preferably, the band 5 is elastically extensible, i.e. it can be elastically stretched. A plurality of band-guiding rollers 6, 7, 8, 9 and 10 are freely rotatably mounted in the housing portion 1. The band 5 is trained about these rollers 6–10 for travel in an endless path in direction of the arrow 5a. It also embraces the hub 3a over a large part of its periphery, i.e. from the point 20 at which the band 5 runs onto the hub 3a to the circumferentially spaced point 20a at which it runs off the hub.

The angular distance between the points 20 and 20a is quite small, for reasons which will be explained later. To enable this distance to be made so small, at least one of the rollers guiding the band 5 is mounted so that it can move towards and away from the hub 3a. To this end, an arm 12 is provided which is mounted on the shaft 11 of roller 9 by means of lugs 13 (not shown). The end of arm 12 which is remote from shaft 11 carries further lugs 14 (one shown) between which the band-guiding roller 10 is rotatably mounted. Thus, roller 10 pivots with the arm 12. The roller 10 and the arm 12 are, however, permanently biased in direction towards the hub 3a by a leafspring 16 which has one end secured at 16a to the cover portion 15 and with its other end presses against the arm 12 in a sense urging the same towards hub 3a. A simple catch or latch (not shown) may usually be provided to hold the cover portion 15 in the closure position.

The cartridge housing has an opening 18 (usually slot-shaped) for ingress and egress of a strip-shaped record carrier 4. On one side this opening is bounded by a guide wall 19 which in effect constitutes an extension of that band section 5a which extends from guide roller 6 to the run-on point 20. An elastically flexible strip member 17 extends along the guide wall 19 and band section 5a and defines with the same in the FIG. 1 condition a guide channel for a leading end portion 4a of an incoming record carrier 4. The opposite ends of member 17 are secured to the cover portion 15 (adjacent the opening 18) and to the arm 12, at 17a and 17b, respectively.

When it is desired to take up a strip-shaped record carrier on the hub 3a, the latter is rotated in direction of the arrow A. The rubber or rubber-like material of band 5 assumes good frictional engagement of the same with the hub 3a; this is enhanced by the fact that band 5 embraces the hub over the major part of the hub periphery. Therefore, the band is entrained by hub 3a in the direction of arrow 5a with no danger of slippage, and reliable engagement and entrainment of the end portion 4a is also assured. The leading end portion 4a is now pushed through opening 18 into the chamber 1a, through the channel defined between wall 19, band section 5a and member 17, and approaches hub 3A substantially tangentially. On reaching point 20, the leading end of portion 4a is gripped between band 5 and hub 3a and now advances around the hub 3a between the same and the band 5. It emerges from beneath the band 5 at point 20a where the band runs off the hub and onto the roll 10 and must continue on to the point 20 to be engaged again so as to start the second convolution of the carrier 4 about the hub 3a.

Such a reliable return of the leading end of end portion 4a from point 20a to point 20 would be at best questionable, were it not for the fact that—in accordance with the invention—the roller 10 and hence the run-off point 20a are located very near to the point 20. This, however, is possible only due to the fact that the roller 10 is mounted so that it can move toward and away from the hub 3a, by pivoting of the arm 12 in the path indicated by the arrow D.

A glance at FIG. 2 will show the reason for this. The more convolutions of carrier 4 are taken up on hub 3a, the larger will become the diameter $d$ of the thus-formed coil C. Since this coil is embraced by the band 5, the latter stretches to accommodate itself to the increased diameter and hence to the increased length of the path which must be traversed by the band 5. This is a very simple and reliable solution, since no other means whatever are required to compensate for the variable length of the path to be travelled by the band 5 at different times.

As the diameter $d$ of coil C increases, the coil urges the arm 12 outwardly away from the hub 3a against the force of spring 16. The arm 12 pivots, but the roll 10 remains in biased contact with the periphery of the coil C. Such outward pivoting causes the flexible guide strip member 17 to bend outwardly in the manner shown in FIG. 2. Such behavior is assured by the fact that in the inoperative position—i.e. when no carrier 4 is in the cartridge—the member 17 is already flexed or bowed outwardly away from the band section 5a, so that it is predisposed to assume the position of FIG. 2. The purpose is to assure initial guidance for the end portion 4a, but later to make member 17 move out of the way of incoming carrier 4 so as to prevent interference with the travel of the same.

When the cover portion 15 is moved to the open position shown in phantom lines in FIG. 2, the member 17 takes along the arm 12 and roll 10, pivoting the same to the phantom-line position. A section 5b of the band 5 is thereby moved out of the way and permits ready removal of the spool 3 from the main housing portion 1. In fact, the increased tensioning of the band 5 which results from movement of cover portion 15 to the open position, actually aids in such removal.

The improved cartridge of the present invention is susceptible of many modifications within the skill of those conversant with this art. Thus, the rollers 6–10 might be replaced with stationary (i.e. non-rotatable) pins or with other members able to perform the necessary band-guiding function. Also, the band 5 need not be of stretchable material; however, in that case it would be necessary to provide means for tensioning it and for compensating for the variable length of the path in which the band travels.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cartridge of the type in which strip-shaped record carriers, particularly microfilm strips, are spooled onto and off a rotatable hub, comprising a housing forming a chamber in which a hub is rotatably mounted and having an opening which communicates with said chamber for ingress and egress of a strip-shaped record carrier; and endless band arranged in said chamber for travel in a path in which it embraces the periphery of said hub from a first to a circumferentially spaced second location at which it respectively runs onto and off said hub, said hub being located outside the confines surrounded by said endless band travelling in said path and said band being advanced in said path in response to rotation of said hub and having two band sections which define with one another a gap for passage of said strip-shaped record carrier between said opening and said hub; and means mounting said band for said travel thereof, including a band-guiding element about which said band is trained and which is mounted adjacent said hub for displacement toward and away therefrom in direction substantially radially of said periphery and permanently biased in direction towards said periphery.

2. A cartridge as defined in claim 1, wherein said band-guiding element is a guide roller.

3. A cartridge as defined in claim 1, comprising means biasing said band-guiding element in said direction.

4. A cartridge as defined in claim 3, wherein said biasing means comprises a biasing spring.

5. A cartridge as defined in claim 1, wherein said band is of an elastically extensible material.

6. A cartridge as defined in claim 1, wherein said band is of rubber.

7. A cartridge as defined in claim 1; further comprising an arm pivotally mounted on said housing and carrying said band-guiding element.

8. A cartridge as defined in claim 1, said housing having a main portion provided with said chamber and having an open side, and a cover portion pivoted to said main portion for movement to and from a closure position in which it overlies said open side.

9. A cartridge as defined in claim 8; further comprising an arm having one end portion pivoted to said housing and another end portion carrying said band-guiding element.

10. A cartridge of the type in which strip-shaped record carriers, particularly microfilm strips, are spooled onto and off a rotatable hub, comprising a housing forming a chamber in which a hub is rotatably mounted and having an opening for ingress and egress of a strip-shaped record carrier on an open side provided with a pivotable cover portion; an endless band arranged in said chamber for travel in a path in which it embraces the periphery of said hub from a first to a circumferentially spaced second location at which it respectively runs onto and off said hub, said band being advanced in said path in response to rotation of said hub; means mounting said band for said travel thereof, including an arm having an end portion pivoted to said housing on another end portion, a band-guiding element on said other end portion and about which said band is trained, and means biasing said other end portion with said band-guiding element towards said periphery; and a flexible strip member having one end secured to said housing adjacent said opening and another end secured to said other end portion of said arm.

11. A cartridge as defined in claim 10, wherein said mounting means includes a further band-guiding element in said chamber adjacent said opening and about which a section of said band travels to said first location, said strip member extending along but spaced from said section when said cover portion is in said closure position so as to define with said section a guide channel for said strip-shaped record carrier.

12. A cartridge as defined in claim 11, wherein said one end of said strip member is secured to said cover portion of said housing.

13. A cartridge as defined in claim 12, wherein said strip member bulges slightly in direction transversely away from said band section when the first-mentioned band-guiding element is closest to said hub and bulges away from said band section to an increasing extent in response to movement of said first-mentioned band-guiding element away from said hub.

14. A cartridge as defined in claim 12, wherein said one end portion of said arm is pivoted to said cover portion.

* * * * *